United States Patent
Catelli et al.

(10) Patent No.: US 6,722,268 B2
(45) Date of Patent: Apr. 20, 2004

(54) DEVICE FOR TRITURATING AND EXTRACTING THE JUICE OR PULP FROM FOOD PRODUCTS

(75) Inventors: Roberto Catelli, Parma (IT); Mario Gozzi, Parma (IT)

(73) Assignee: Rossi & Catelli S.p.A., Parma (IT)

( * ) Notice: Subject to any disclaimer, the term of this patent is extended or adjusted under 35 U.S.C. 154(b) by 0 days.

(21) Appl. No.: 10/464,747

(22) Filed: Jun. 19, 2003

(65) Prior Publication Data
US 2004/0007139 A1 Jan. 15, 2004

(30) Foreign Application Priority Data
Jul. 10, 2002 (IT) ..................... MO2002A0201

(51) Int. Cl.[7] .............. A23L 1/00; A23N 1/00; A23N 1/02; A47J 19/02; B02C 18/12
(52) U.S. Cl. .............. 99/510; 99/495; 241/92; 241/101.01
(58) Field of Search .............. 99/495, 509–513, 99/348; 241/37.5, 92, 65, 69, 172, 179, 180, 101.1, 101.2, 101.3, 101.01, 199.12, 260.1, 261, 282.2, 285.1; 366/314, 279, 601; 426/481, 482, 489, 518, 616

(56) References Cited

U.S. PATENT DOCUMENTS

| | | | |
|---|---|---|---|
| 1,848,225 A | | 3/1932 | Schmidt |
| 2,416,043 A | | 2/1947 | Bucher-Guyer |
| 2,558,799 A | * | 7/1951 | Thomas .................. 99/510 |
| 2,688,470 A | * | 9/1954 | Marco .................. 366/155.2 |
| 3,677,478 A | * | 7/1972 | Schutte .................. 241/82 |
| 4,543,879 A | * | 10/1985 | Catelli .................. 99/472 |
| 5,156,872 A | * | 10/1992 | Lee .................. 426/489 |
| 5,193,754 A | * | 3/1993 | Pujol .................. 241/65 |
| 5,221,055 A | * | 6/1993 | Kuan .................. 241/199.12 |
| 5,249,514 A | * | 10/1993 | Otto et al. .................. 99/454 |
| 5,381,730 A | * | 1/1995 | Kim .................. 99/510 |
| 5,396,836 A | * | 3/1995 | Kim .................. 99/510 |
| 5,452,650 A | * | 9/1995 | Lee .................. 99/510 |
| 5,806,413 A | * | 9/1998 | Trovinger .................. 99/492 |
| 5,906,154 A | * | 5/1999 | Yoon et al. .................. 99/510 |

FOREIGN PATENT DOCUMENTS

| | | |
|---|---|---|
| EP | 0 721 744 A1 | 7/1996 |
| WO | 00/47065 | 8/2000 |
| WO | 00/47066 | 8/2000 |

* cited by examiner

Primary Examiner—Timothy F. Simone
(74) Attorney, Agent, or Firm—Young & Thompson

(57) ABSTRACT

The device for triturating and extracting juice or pulp from food produce is used in particular in the food preserves industry for triturating and subsequently separating the juice or pulp from fruit or vegetables, in particular in a cold-working process. The device comprises a refiner of known type provided with a rotating shaft having blades rotating internally of a sieve contained in an external casing; a triturator group receives a produce to be processed from an infeeder archimedes screw and introduces the produce into the refiner; the triturator group comprises a fixed cylindrical cage, fixed to a casing of the archimedes screw and also fixed to the external casing of the refiner, is arranged coaxially to these machines, and exhibits apertures and a cutting group which rotates with the refiner and which is provided with frontally-acting cutters, and which is arranged internally of the cylindrical cage with the cutters facing the archimedes screw and being provided with radial blades arranged downstream of the cutters.

7 Claims, 2 Drawing Sheets

DEVICE FOR TRITURATING AND EXTRACTING THE JUICE OR PULP FROM FOOD PRODUCTS

BACKGROUND OF THE INVENTION

Specifically though not exclusively the invention is usefully applied in the food preserves industry for chopping and subsequently separating the juice or pulp of fruit and vegetables from the skins and peels, seeds and other waste present in the product. The invention particularly relates to cold-processing operations.

Devices of this type have been well-known in the prior art for some time (for example such as the device described in European Patent EP 721744 belonging to the same applicant), and an infeeding archimedes screw, also of known type, into which the produce to be processed is introduced. The produce is sent by the screw to a triturator group which performs a first cutting operation, whence the triturate is introduced into the refiner where the pulp or juice extraction process is completed, i.e. the refinement process is concluded.

The machines described can be separated one from another and connected with conduits for transport of the product from one to another, or they can be connected coaxially one to another so as to have a continuous flow of product from the archimedes screw to the refiner. This latter solution, which enables a considerable time saving between the first cut of the produce and the completion of the refining process, is what the present invention concerns.

The use of a chopping group in combination with a refiner is adopted when hard or large-size produce is processed cold, or with a brief pre-cooking operation only; the produce is, for example, apples, pears or the like; these are first chopped and the triturate is introduced into the refiner which transforms it into a purée of pulp and juice which is sent on for further processing. This is due to the fact that these types of produce are not directly treatable with acceptable results by normal refiners.

In known devices the product is pushed, generally by an archimedes screw, internally of the triturator, which carries out a first cutting operation to reduce the produce into small pieces; subsequently, thanks to the axial pushing action of the archimedes screw, the product is forced to pass through a sieve which further reduces the size of the pieces of produce which are then sent on to the refiner. Other parts of the produce apart from the pulp are chopped down into small pieces, for example seeds, stalks etc., and the product arriving from the refiner often contains these crushed "extraneous materials" which can jeopardise the quality of the finished product.

Other drawbacks of known devices are represented by the low productivity of the triturators and the difficulty in regulating them, necessary when changing type of product processed, which is generally obtained by changing the rotation speed of the cutters, which also leads to a change in the operating mode of the refiner.

The main aim of the present invention is to obviate the above-mentioned drawbacks in the prior art by providing a device, having high productivity levels, which reduces to a minimum the breaking-up of produce elements other than pulp. An advantage of the invention is that it allows easy and rapid regulation of the triturator, which if so desired can be independent of the refiner operation. A further advantage of the invention is that necessary cleaning and maintenance operations can be carried out simply and rapidly.

SUMMARY OF THE INVENTION

The device for triturating and extracting juice or pulp from food produce is used in particular in the food preserves industry for triturating and subsequently separating the juice or pulp from fruit or vegetables, in particular in a cold-working process. The device comprises a refiner of known type provided with a rotating shaft having blades rotating internally of a sieve contained in an external casing; a triturator group receives a produce to be processed from an infeeder archimedes screw and introduces the produce into the refiner; the triturator group comprises a fixed cylindrical cage, fixed to a casing of the archimedes screw and also fixed to the external casing of the refiner, is arranged coaxially to these machines, and exhibits apertures and a cutting group which rotates with the refiner and which is provided with frontally-acting cutters, and which is arranged internally of the cylindrical cage with the cutters facing the archimedes screw and being provided with radial blades arranged downstream of the cutters.

BRIEF DESCRIPTION OF THE DRAWINGS

These aims and advantages and others besides are all achieved by the present invention, as it is characterised in the claims that follow.

Further advantages of the present invention will better emerge from the detailed description that follows of a preferred but non-exclusive embodiment of the invention, illustrated purely by way of non-limiting example in the accompanying figures of the drawings, in which.

DESCRIPTION OF THE PREFERRED EMBODIMENTS

Figure 1:
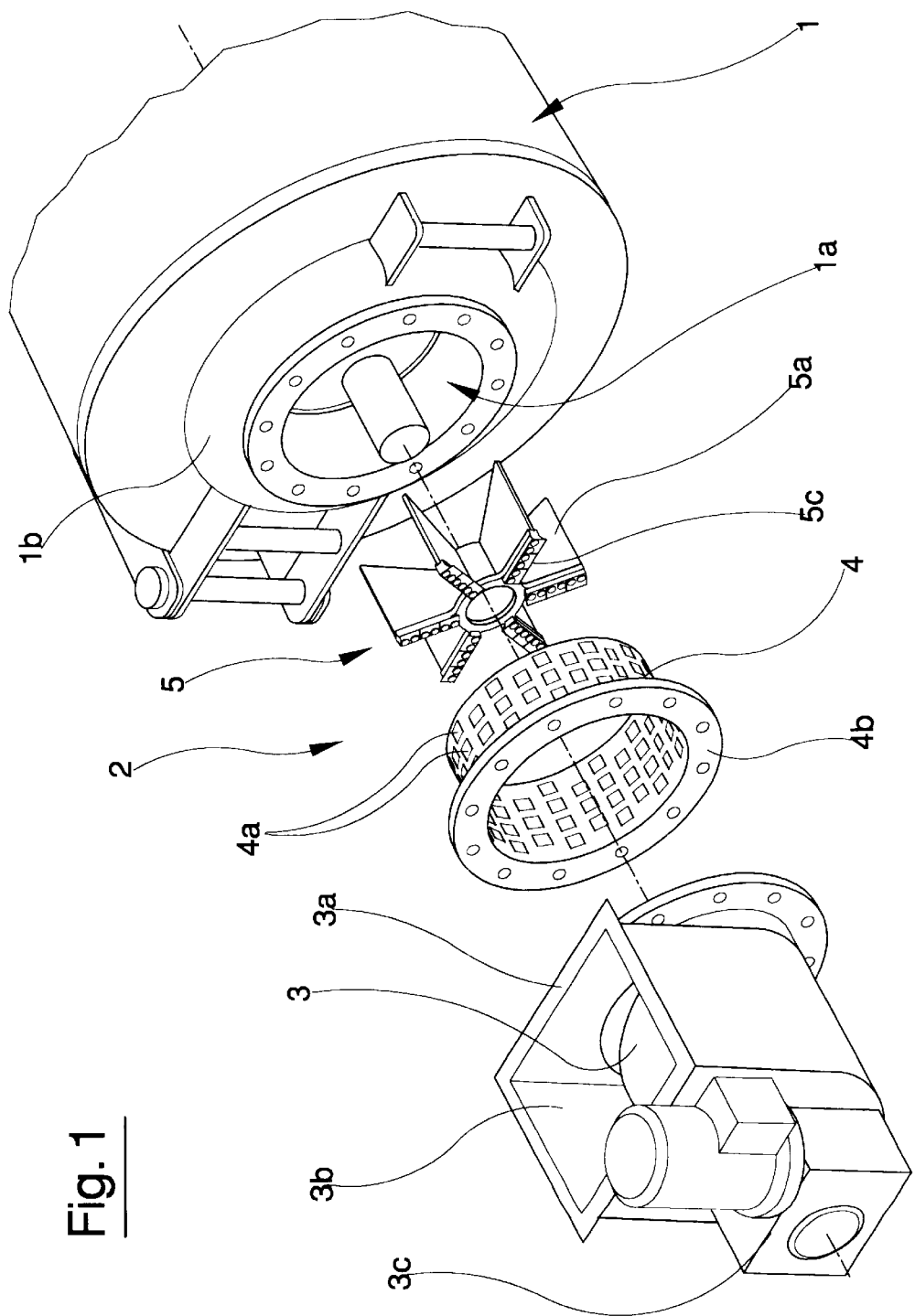
FIG. 1 is an exploded schematic perspective view of some elements making up the device.
Figures 2, 3:
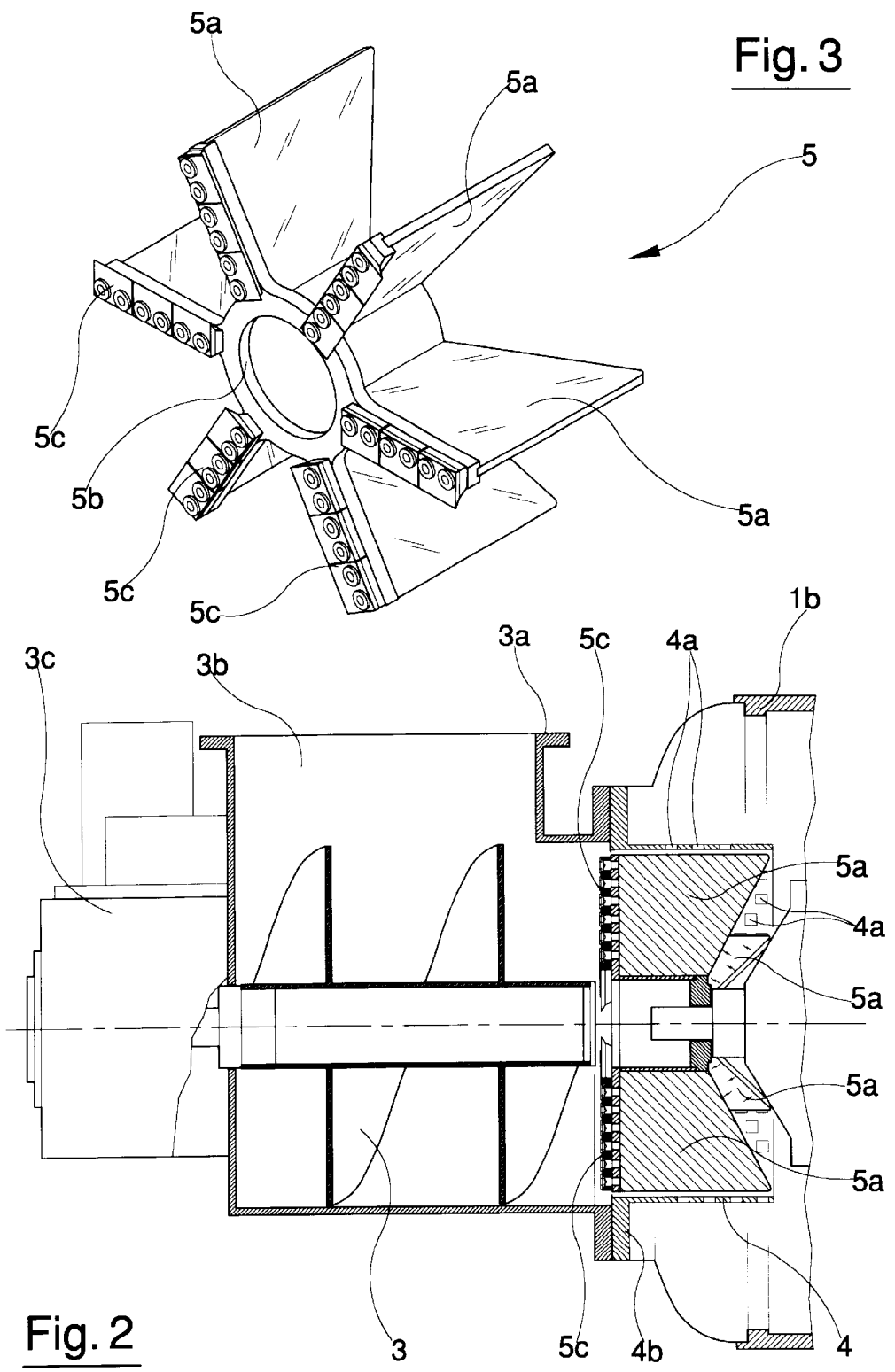
FIG. 2 is a vertical elevation of the triturator of the device connected to the archimedes screw and the refiner.
FIG. 3 is a perspective view of the cutting group of the device.

The device comprises a refiner machine 1 of known type provided with a rotating shaft having blades which rotates internally of a sieve contained in an external casing 1b; the refiner used for the device can be of various types and is illustrated schematically and incompletely, showing only those parts which are involved in the connection with the other elements of the device. In particular, the illustration includes, for reasons that will become clearer herein below, an internal housing 1a which is afforded in the initial zone of the refiner and which is set in communication with the inside of the refiner.

The device further comprises an archimedes screw 3 for introduction of the produce, which screw 3 is also of known type and which comprises a casing 3a which contains the archimedes screw 3 and which exhibits an opening 3b for the introduction of the produce; as with archimedes screws of known type, the screw 3 is rotated by a gear reducer 3c.

The device further comprises a triturating group 2, interpositioned between the screw 3 and the refiner 1, which, as will be better described herein below, receives the produce to be processed coming from the archimedes screw 3, chops it and introduces it into the refiner.

The triturator 2 group comprises a cylindrical cage 4 having a radial connection flange 4b which enables connection of the cage both to the casing 3a of the archimedes screw 3 and to the casing 1b of the refiner. For this purpose, both the casing 3a and the casing 1b are provided with similar flanges to which the cage 4 is connected by, for example, bolts. When the cage 4 is connected to the refiner 1, the cage 4 is located in the internal housing 1a of the refiner 1.

The cage 4 is provided with a plurality of apertures 4a which are preferably square-shaped and which are alternated with full zones 4c having the same shape and size as the apertures 4a. The cylindrical wall of the cage 4 housed inside the refiner in effect exhibits a sort of "chess-board" configuration, formed by alternating apertures 4a and full zones 4c.

To modify the operative conditions of the device, the device is combined with a plurality of cylindrical cages 4 which are used singly and which are interchangeable one with another. Each of the cages 4 is provided with apertures 4a having shapes and/or sizes and/or arrangements which are different from the other cages 4.

It is also possible to use a cage having variable-dimension apertures; this could be achieved, for example, by providing a further cylinder, provided with apertures arranged on the cylindrical part of the cage and rotating on command with respect to the cylindrical part of the cage so as to superimpose the apertures of one on the those of the other, thus varying the dimensions of the apertures effectively afforded on the cage. The constructional complication implicit in this and other solutions, however, suggests it is more advantageous to substitute the whole cage, especially in view of the extreme simplicity with which the triturator group can be disassembled.

The cage 4 is arranged coaxially to the common axis of the archimedes screw 3 and the refiner 1 and is fixed with respect to the casings of the machines.

The triturator group 2 further comprises a cutting group 5 which has a cutting element having a frontal action which is perpendicular to the rotation axes of the archimedes screw 3 and the refiner 1.

The cutting group is arranged internally of the cage 4 with the cutting elements facing the archimedes screw 3, and is connected, coaxially and solidly in rotation, to the rotating shaft of the refiner 1. The cutting group is also provided with radial blades 5a that are arranged downstream of the cutting element and internally of the cage 4.

In a preferred embodiment, illustrated in the figures, the cutting group 5 comprises a central hub 5b, for connection with the refiner 1 shaft, from which cenral hub 5a the blades 5a fan out in a radial direction. The cutting group 5 therefore has a solid star shape.

A plurality of cutters 5c are removably connected on the frontal section of the blades 5a facing towards the archimedes screw 3. Each blade 5a is therefore provided with cutters 5c.

In particular, a group of cutters 5c is removably constrained to the frontal section of each blade 5a; the number and sizes of the cutters making up each group can be of a number which entirely covers the blades 5a, as shown in the figure of the drawing; both the number and the size of the cutters making up each group can however be varied so as to cover only partially and variously the frontal section of each blade 5a.

The connection of the various cutters 5c with the blades 5a is obtained, very simply, by means of bolts which screw into special threaded holes afforded in the frontal part of the blades 5a.

The radial dimensions of the blades 5a are such that, when the cutting group is arranged internally of the cage 4, the radial distance between the radial blades 5a and the inside of the cage 4 is greater than the maximum dimension of any bodies present in the pulp of the produce to be treated. In particular, the radial distance between the blades 5a and the inside of the cage 4 is maintained at at least six millimeters inasmuch as this is the measurement which avoids crushing the non-pulpy elements of the produce, i.e. seeds, stalks and so on. The distance can, however, be increased should these unwanted elements be of greater size.

A cutting group as described and illustrated herein exhibits a limited mass in the radial section of the cage 4 and thus enables easy flow of the produce through the triturator.

The device operates as described herein below.

The produce to be processed, which is usually in whole pieces and raw, but which can also be slightly pre-cooked, is inserted continuously into the archimedes screw 3, which is set in rotation by the gear reducer 3c. The motion of the archimedes screw 3 pushes the produce against the cutters 5c arranged on the frontal section of the blades 5a of the cutting group which, as mentioned above, rotates together with the shaft of the refiner.

On crossing the cutters 5c the produce is cut and the pieces thereof are pushed into the spaces exiting between one blade 5a and another. The centrifugal force impressed by the blades 5a on the pieces of product pushes them against the cage 4 where a sort of extrusion, rather than a complete pulping, is performed, in which the pieces of produce are extruded through the apertures of the cage 4, with a consequent further reduction in the sizes of the pieces of produce, the final dimensions of which obviously depend on the sizes of the cage apertures. The cage 4 behaves therefore not as a sieve, but rather as an extruder.

After crossing the cage 4, which as previously mentioned is located inside a housing in connection with the internal part of the sieve of the refiner 1, the produce in pieces is introduced into the refiner, where it is transformed into purée of pulp and juice.

Given the distance between the blades 5a and the internal part of the cage 4, the seeds, stalks an any other foreign bodies are not crushed against the cage and therefore do not issue substances which might alter the quality of the final purée. It is worth noting that the simple cutting of foreign bodies, which could happen during the crossing of the produce across the blades 5a, does not free the substances referred-to above, which are issued in significantly damaging quantities only when the bodies are crushed.

Also worthy of note is the fact that during extrusion of the product through the apertures of the cage 4, centrifugal force is the main mover of the product impressed by the rotation of the blades 5a of the cutting group with respect to the compressing action impressed on the product by the thrust of the archimedes screw; thus, by increasing the rotation speed of the archimedes screw, the productivity of the device can be increased without creating any blocking or excessive compression forces therein.

The operating characteristics of the device, in particular the triturator group, can be very easily modified, according to the type of product under processing; given that the device is extremely simple to disassemble (it is sufficient to remove the bolts joining the flanges of the archimedes screw, the cage of the triturator group and the refiner), is also extremely easy to change the cage in use for another having different apertures or differently-arranged apertures, or change the arrangement or the type of the blades of the various groups, thus obtaining pieces of produce of different dimensions. The substitution of the whole cutting group, however rarely necessary, involves detachment thereof from the refiner shaft, a simple and quite rapid operation.

The simplicity of disassembly of the triturator group also enables easy and rapid cleaning or any necessary maintenance operations to be carried out.

What is claimed:

1. A device for triturating and extracting the juice or pulp from food products, comprising a refiner of known type provided with a rotating shaft, having blades rotating internally of a sieve contained in an external casing; a triturator group is coaxial to the refiner and receives a produce to be processed from an infeeder archimedes screw and introduces the produce into the refiner; characterized in that the triturator group comprises: a fixed cylindrical cage, fixed to a casing which contains the archimedes screw and also fixed to the external casing of the refiner, which cylindrical cage is provided with a plurality of apertures and is arranged coaxially to a common axis of the archimedes screw, the triturator group and the refiner; a cutting group, solid in rotation with the refiner and having a cutting element which acts frontally and perpendicularly to a rotation axis of the refiner and is arranged internally of the cylindrical cage; the cutting element being positioned facing the archimedes screw and being provided with radial blades arranged downstream of the cutting element and internally of the cylindrical cage; a radial distance between the radial blades and an inside of the cylindrical cage being greater than a maximum dimension of any extraneous bodies present in the pulp to be processed.

2. The device of claim 1, characterized in that the cutting group comprises a central hub destined to receive a shaft which is solid in rotation with the shaft of the refiner; the radial blades originating in and departing from the central hub; a plurality of cutters, each of which is removably constrained to the frontal section of the blades, which frontal section is facing the archimedes screw.

3. The device of claim 2, characterized in that the cutting group comprises: a plurality of groups of cutters, each of which is removably constrained to the frontal section of a blade of the blades.

4. The device of claim 1, characterized in that: the cylindrical cage comprises a flange for radial connection, for enabling a connection between the cylindrical cage, the external casing and the refiner casing; the refiner comprising an inner housing in communication with the inside of the refiner, which inner housing receives the cylindrical cage when the cylindrical cage (4) is connected to the refiner.

5. The device of claim 1, characterized in that it comprises a plurality of cylindrical cages which are interchangeable one with another thereof; each of the plurality of cylindrical cages being provided with a plurality of apertures having shapes and/or sizes and/or arrangements which are different from others of the plurality of apertures.

6. The device of claim 1, characterized in that a radial distance between the radial blades and the inside of the cylindrical gate is of at least six millimeters.

7. The device of claim 1, characterized in that the plurality of apertures of the cylindrical cage have a square shape and are distanced one from another thereof by interposition of full zones having a same shape and size as the apertures.

* * * * *